March 11, 1941.  R. M. BOTLEY  2,234,620
CONVEYER
Filed Aug. 5, 1938  3 Sheets-Sheet 1

INVENTOR:
RICHARD M BOTLEY
BY C. E. Hammitt, Jr.
ATTORNEY

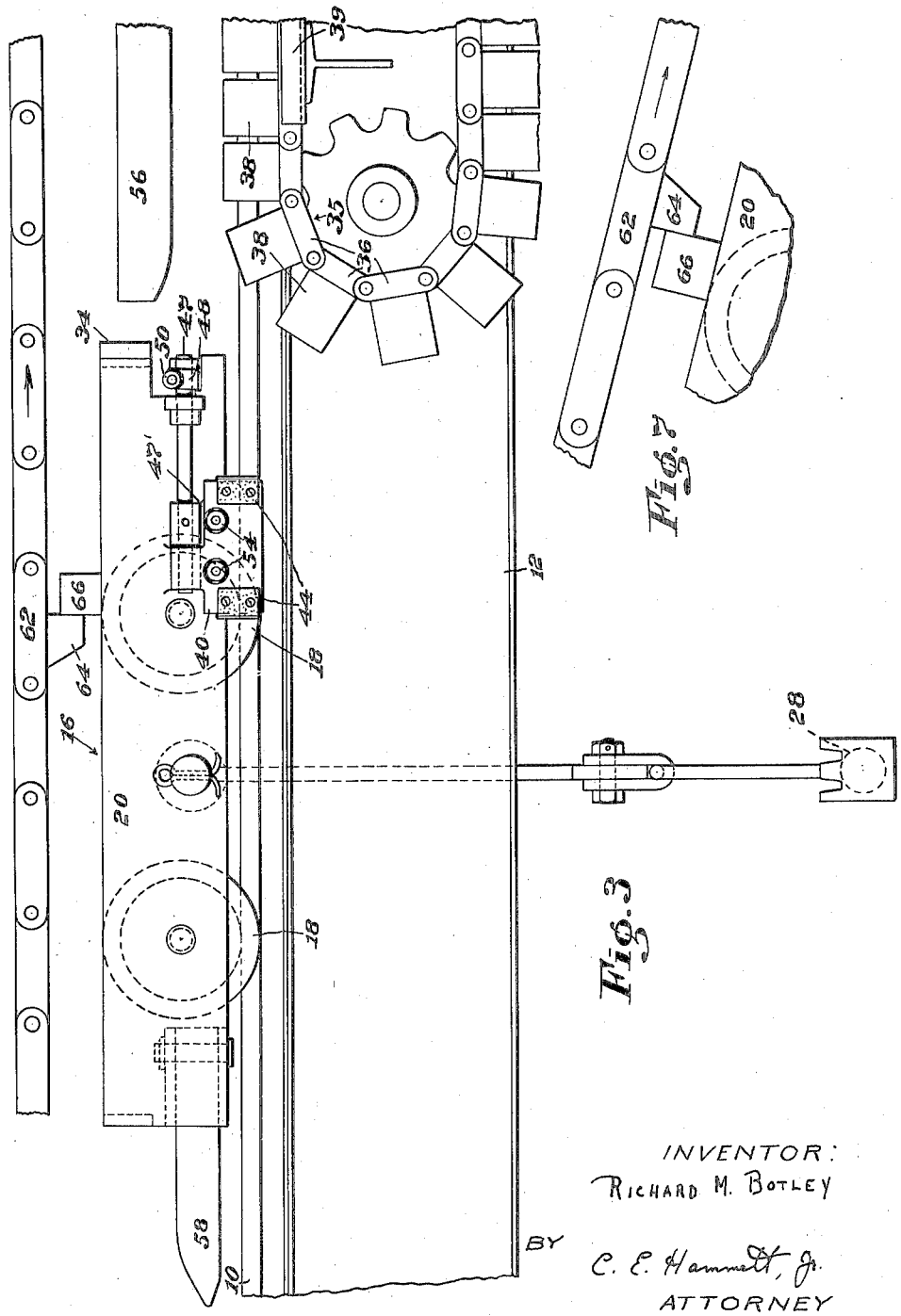

March 11, 1941. R. M. BOTLEY 2,234,620
CONVEYER
Filed Aug. 5, 1938 3 Sheets-Sheet 3
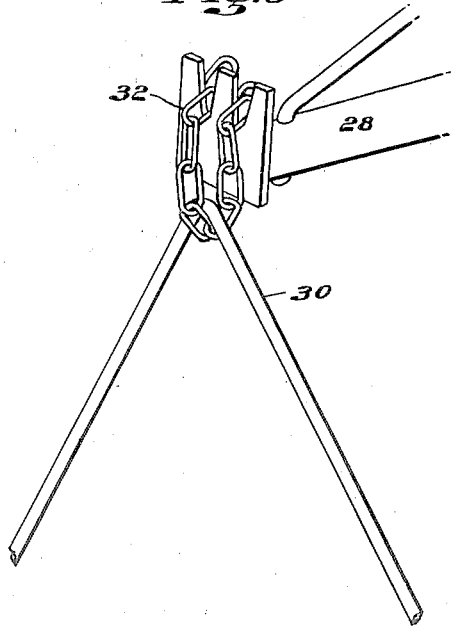
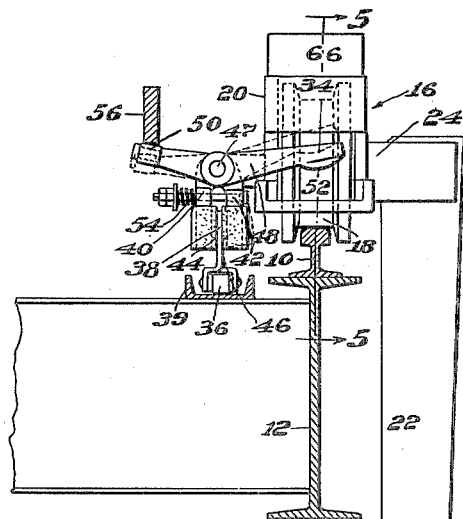
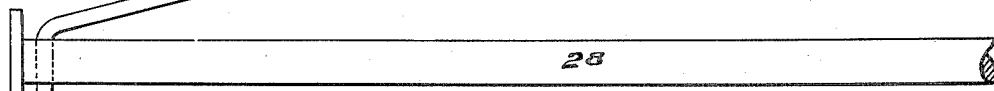
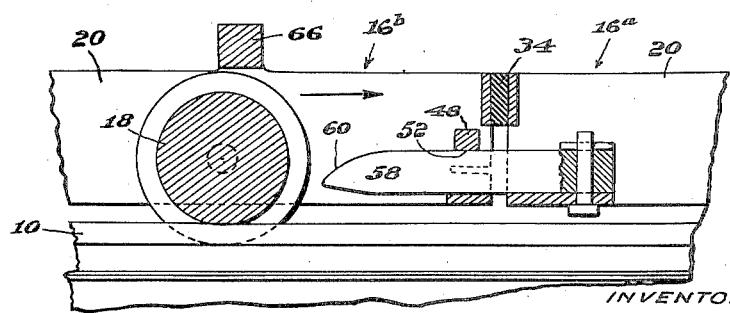
INVENTOR:
RICHARD M. BOTLEY
BY C. E. Hammett, Jr.
ATTORNEY Patented Mar. 11, 1941

2,234,620

UNITED STATES PATENT OFFICE 2,234,620

CONVEYER

Richard M. Botley, Honolulu, Territory of Hawaii, assignor to Hawaiian Pineapple Company, Limited, Honolulu, Territory of Hawaii, a corporation of Hawaii Application August 5, 1938, Serial No. 223,233

10 Claims. (Cl. 104—193)

The present invention relates to conveyers and has for its object the provision of improvements in devices of this nature.

In transporting material from place to place, there are frequently utilized tramway systems in which the motive power for the cars or other carriers is furnished by an endless cable or like towing means, the individual carriers being equipped with gripping or other engaging means which may be manually or automatically attached to or detached from the cable.

In accordance with one feature of the present invention, improved means for attaching the individual cars or carriers to the cable and for detaching them therefrom, are provided. The operation of this system may be likened to that of a water flume on which objects are floated to a destination, in that loads may be attached at one end of, or at any point along, a conveyer system, by which system they will be carried to the desired unloading station where they will become automatically disengaged from the tow rope or chain and will there accumulate as a reserve supply which is available when and as needed.

For example, fruit may be transported to a cannery by a tramway system in which the fruit is carried on cars or skips which are suspended from a rail or other support, along which they are towed by a cable or chain to which the cars are attached. It will be desirable in this case to start the fruit from any loading point on the conveyer system as it arrives at that point and to unload it at any unloading point as need arises. The fruit may be required at the cannery in large batches and the times when these batches are required will bear no relation to the arrival of the fruit at the loading point on the system. It will thus be advantageous to build up a sizable reserve supply at the cannery unloading point, and the present invention provides means for automatically accomplishing this.

A further feature of the invention involves the automatic starting of the conveyers constituting this reserve stock, for example after they have been unloaded, whereby when the first car is started off, succeeding cars will automatically and successively move off behind it.

The invention also provides an improved form of chain or cable for towing the cars and improved gripping means for engaging the cars with the chain. Auxiliary means for supplying power or braking action when needed are also provided.

For a better understanding of the invention, reference may be had to the accompanying drawings, in which one embodiment of my invention is shown for illustrative purposes. The drawings illustrate the application of my invention to a monorail carrier wherein cars or skips for the transportation of fruit or other material are suspended from trucks which run along a rail, the motive power being supplied by a series of endless chains with which the trucks may be automatically engaged and/or disengaged.

In the drawings,

Fig. 3 is a side elevation of a truck unit;

Fig. 4 is an end elevation of a truck unit, showing in more detail means for engaging the truck with the endless chain and disengaging it therefrom;

Fig. 5 is a vertical longitudinal section taken on the line 5—5 of Figs. 2 and 4;

Fig. 6 is a perspective showing a skip attachment detail;

Fig. 7 is a fragmentary elevation showing a braking connection.

Any convenient means for supporting the skip or car 8, for example a rail 10, may be provided. The rail 10 is shown as mounted on an I beam 12 which in turn is supported by a frame 14.

Figure 1:
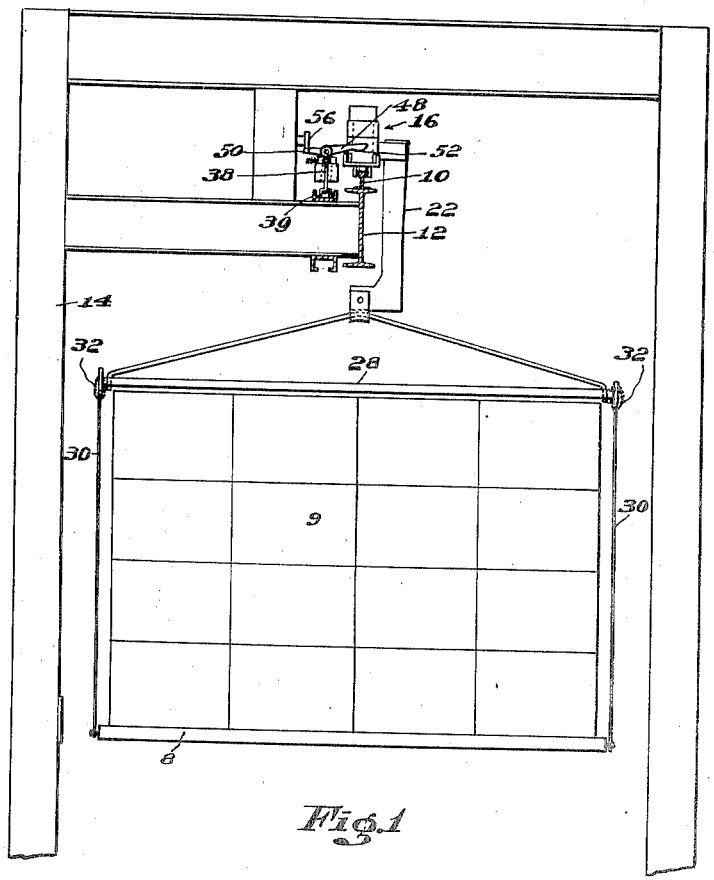
Fig. 1 is a diagrammatic elevation showing one form of supporting structure for the rail and showing a car or skip suspended from a truck thereon.
Figure 2:
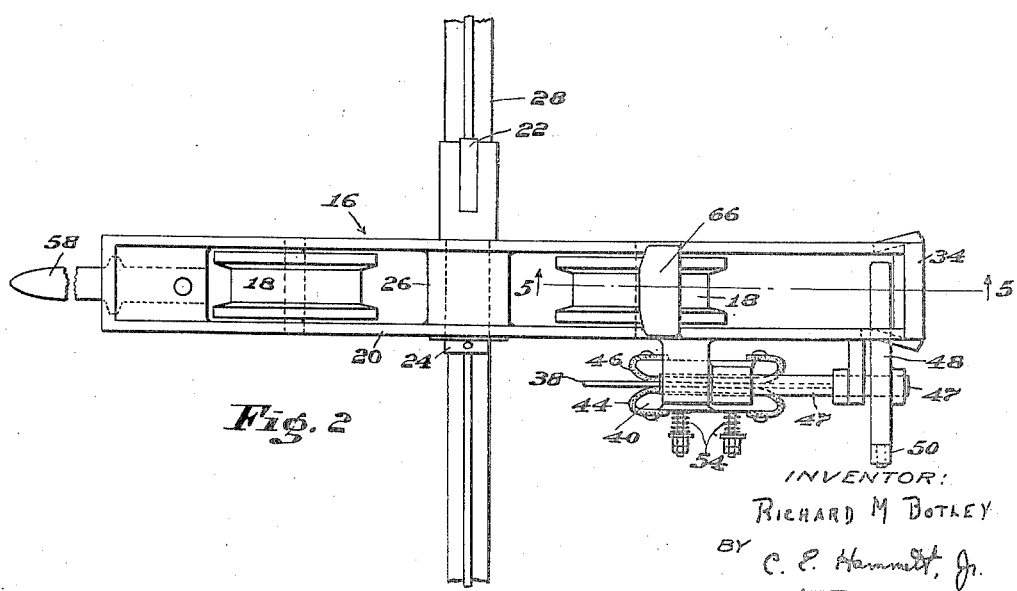
Fig. 2 is a plan view of one of the truck units.

The truck from which the load is suspended, generally designated by the numeral 16, comprises wheels 18 which are flanged to straddle the rail 10 and are mounted in suitable bearings in the truck frame 20. The car or skip may, for example, be suspended from the truck in the manner shown in Figs. 1, 2 and 4. In this construction an underhung supporting arm 22, at the upper part of which is a heavy pin 24, is supported by said pin in a bushed bearing 26 secured to the trolley frame. This permits the underhung arm to swing freely in a forward or backward direction to adjust itself relatively to the truck in accordance with the slope of the rail 10. The spreader bar 28 is pivotally suspended from the supporting arm 22 so that it may swing sidewise of the rail relatively to said arm. The hairpin supports 30 may be detachably secured to the spreader bar by a simple chain coupling 32 (Fig. 6).

Each truck may be provided with a bumper 34 of resilient material, for example rubber.

The cable which hauls the trucks and their attached cars along the rail may be of any suitable form. A preferred form, as illustrated, comprises a chain 35, the links 36 of which are provided with upstanding fins 38. A series of chains, running in guideways 39, will ordinarily be used, although one chain might be used on a short, straight carrier system.

The gripping means for attaching and detaching the truck from the conveyer chain may comprise arms 40, 42 carrying opposed gripping faces or friction shoes 44, 46 which may be lined with brake lining or like friction material and are adapted to grip between them the fins 38 of the chain 35.

The gripping arms 40 and 42 may conveniently be mounted on an extension at one side of the truck 16. One of the arms, as 40, may be rigidly mounted, while the other 42 is pivotally mounted on a pin or shaft 47. An arm 48 is rigidly attached to the pivotally mounted arm 42, the arm 48 carrying two cam followers or bearing surfaces 50 and 52. It will be seen from Fig. 4 that either depressing the left hand end or elevating the right hand end of the arm 48 will move the attached friction shoe 46 away from the fin 38 of the conveyer chain, thus releasing the truck from the chain. In Fig. 4 the full lines indicate the friction shoes and arm 48 in gripping position and the broken lines indicate the same in release position.

A spring 54 may be so mounted as to urge the friction shoe 46 normally against the fin 38 and this spring may be made adjustable to vary the gripping pressure of the shoe.

Initial engagement of the gripping mechanism with the chain may be effected in various ways. For example, the shoe 46 may be held out of engagement with the chain and released at the proper time, whereupon the spring 54 will cause said shoe to engage the chain and grip it between the two shoes 44, 46. Smooth starting and avoidance of jerks may be facilitated by so adjusting the tension of the spring 54 as to permit slight initial slippage of the fins 38 between the shoes 44, 46.

The shoes 44, 46 having gripped the fins 38, the moving chain 35 hauls the truck 16 with its suspended load 9 along the rail 10. Upon arriving at its destination, the truck may be released from the chain by a release cam 56, which engages the roller or cam follower 50 and depresses the left hand end of the arm 48, as seen in Fig. 4, thus moving the shoe 46 out of gripping engagement with the fin 38 of the chain. The truck and its suspended load then come to a stop.

A release cam of this or any other suitable type may be utilized to bridge the gap between two chains, by causing the friction shoes to release one chain as it goes around its terminal pulley and to grip the next chain after the inertia of the truck and car, or auxiliary power, has carried them across the gap between the chains.

In order that a number of cars may be automatically released one after another to provide a surplus or reserve supply of cars at any desired point on the system, means are provided whereby when any truck is released from the conveyer chain, as by the cam 56, and slows or comes to a stop, succeeding trucks, although continuing to move along the rail until they come up to a preceding truck which has stopped, upon closely approaching such truck will be automatically released from the conveyer chain and will come to rest behind the preceding truck. To accomplish this, there is provided on each truck release means adapted to disengage the friction shoes of the next succeeding truck from gripping engagement with the chain when the succeeding truck has approached to a predetermined distance from the said truck. Thus each truck may be provided with a rearwardly extending release finger 58 adapted to engage the bearing surface 52 on the arm 48 and thus to raise the right hand end of the arm 48, thereby moving the friction shoe 46 out of gripping engagement with the fin 38.

The operation of this automatic release mechanism is further illustrated in Fig. 5, from which it will be seen that when the truck 16a has come to a stop or slowed down sufficiently to permit a succeeding truck 16b to overtake it, the rearwardly extending release finger 58 of the truck 16a will run in under the arm 48 of the truck 16b. As the finger 58 comes into contact with the bearing surface 52 on the arm 48, the surface 52 will ride up the sloping surface 60 of the finger 58, tilting the arm 48 and releasing the friction shoe 46 from gripping engagement with the chain.

The same thing happens as each succeeding truck catches up with its predecessor which has either stopped or slowed down sufficiently to permit it. Thus, by merely stopping any given loaded truck, a reserve supply of whatever commodity is being carried by the cars may be accumulated at any desired point in the conveyer system, for example at a cannery. In the same way, of course, a reserve supply of empty cars may be accumulated at any desired point in the system.

When the desired number of trucks has been unloaded, the cam follower or roller 50 of the first truck is released from engagement with the cam 56, permitting the spring 54 to cause the friction shoe 46 to grip the moving chain, whereupon the first truck starts off. This movement of the first truck withdraws its release finger 58 from engagement with the arm 48 of the next succeeding truck, whereupon the spring 54 of that succeeding truck brings its friction shoe 46 into gripping engagement with the moving chain and the next truck starts off. This operation is repeated until the desired number of trucks has been carried away, whereupon the next truck may again be stopped as by the cam 56 or in any other convenient manner.

As a means of supplying additional power, for example to pull the loaded trucks up grades, I may provide a supplementary chain or chains 62 (Fig. 3), provided with lugs 64, at points where such supplementary and additional power is needed. The trucks may be provided with lugs 66 so disposed with relation to the lugs 64 that when the truck comes beneath the supplementary chain 62 and its speed decreases to less than that of the chain 62, the lug 64 will engage the lug 66, whereupon the chain 62 will assist the chain 35 in pulling the load up the grade.

Similarly, I may provide for braking action on down grades by providing on such grade a supplementary chain 62, the lugs 64 of which engage the front sides of the lugs 66, as shown in Fig. 7, when the speed of the trucks is greater than that of the chain 62.

In this manner additional power may be provided where needed and braking action may also be provided on down grades.

Instead of engaging directly with the trucks, the auxiliary or supplementary chain 62 could engage similarly with the chain 35 to provide additional pulling or braking power.

Having thus described my invention, I claim:

1. In a conveyer system, a plurality of trucks adapted for movement along a support, power means for moving said trucks along said support, gripping means for attaching said trucks to said power means, said trucks being provided with release means which, when the trucks approach within a predetermined distance from each other, engage the gripping means on the next succeeding truck and disengage the same from operative engagement with the power means.

2. In a conveyer system, a plurality of carriers provided with gripping means and adapted to be towed along a supporting structure by gripping engagement with a towing cable, and associated with each carrier a rearwardly projecting arm adapted to engage the gripping means on the next succeeding carrier and to disengage the same from operative engagement with the towing cable when any two carriers approach within a predetermined distance from each other.

3. In a conveyer system, a truck having relatively movable jaws adapted to grip a towing cable, a pivotally mounted lever for separating said jaws to release the cable, a rearwardly extending arm adapted to engage the lever of the next succeeding truck when two trucks approach within a predetermined distance from each other and to move said lever and thus to release the jaws of said succeeding truck from gripping engagement with the cable.

4. In a conveyer system, means for engaging and disengaging a truck from a towing cable comprising arms mounted on the truck, said arms supporting opposed gripping faces, one of said arms being rigidly mounted and the other movably mounted, a lever mounted on the truck, said lever provided with two bearing surfaces, one on its upper surface and another spaced therefrom and on its lower surface, said lever being so connected with said movable arm that pressure on either of the said bearing surfaces will separate said gripping members to release the cable.

5. In a conveyer system, a plurality of cars mounted for movement along a support, a towing chain comprising a series of links each provided with an upstanding flat fin and gripping surfaces mounted on the cars for engaging said cars with said fins, whereby the cars may be towed along the support by said chain.

6. In a conveyer system, a supporting structure, towing means, and a plurality of trucks adapted to be moved along said supporting structure, each of said trucks being provided with gripping means for engaging the truck with the towing means, and a rearwardly extending arm on one truck which, when a succeeding truck approaches within a predetermined distance, will separate the gripping means of such succeeding truck and thus disengage said truck from the towing means, and will maintain said gripping means thus separated so long as the trucks remain within a predetermined distance of each other, said arm being adapted to release said gripping means when the trucks are separated from each other to a predetermined extent, whereupon the gripping means automatically re-engages the towing means.

7. In a conveyer system, a plurality of trucks adapted for movement along a supporting structure, one of said trucks provided with attaching means normally urged into operative engagement with a towing line, and another of said trucks provided with a rearwardly extending member adapted to engage with an adjacent truck and by such engagement to disengage the attaching means of said truck from operative engagement with the towing line when the trucks approach within a predetermined distance of each other and also to release said attaching means for automatic re-engagement with the towing line when the trucks are separated from each other to a predetermined extent.

8. In a conveyer system, a truck having movable jaws normally urged into gripping engagement with a towing cable, a pivotally mounted lever for separating said jaws to release the cable, a rearwardly extending arm adapted to engage the lever of the next succeeding truck when two trucks approach within a predetermined distance from each other and to move said lever and thus to release the jaws of said succeeding truck from gripping engagement with the cable, said arm adapted to move out of engagement with said lever when the trucks are separated by a predetermined distance, whereupon the jaws automatically re-engage the truck with the towing cable.

9. In a conveyer system, a towing line and a plurality of trucks adapted for movement along a supporting structure, said trucks being provided with attaching members which are normally urged into operative engagement with the towing line, said trucks also provided with cam members which are adapted, by contact with the attaching mechanism of an adjacent truck, to disengage the attaching member of such adjacent truck from operative engagement with the towing line and also to release said member when adjacent trucks are separated by a predetermined distance, whereupon the attaching member automatically attaches its truck to the towing line.

10. In a conveyer system, a plurality of cars mounted for movement along a support and towing means carrying a series of projecting plates which are positioned generally parallel to the line of travel of said towing means, said cars provided with opposed gripping surfaces for engaging with said plates, whereby the cars may be towed along the support.

RICHARD M. BOTLEY.